Oct. 10, 1933.    A. M. VRAGEL    1,929,798
PIE VENTILATOR
Filed April 20, 1932

INVENTOR
Alice M. Vragel
Harold E. Stonebraker,
ATTORNEY

Patented Oct. 10, 1933

1,929,798

UNITED STATES PATENT OFFICE 1,929,798

PIE VENTILATOR

Alice M. Vragel, Rochester, N. Y.

Application April 20, 1932. Serial No. 606,426

1 Claim. (Cl. 53—6)

This invention relates to pie ventilators of the kind employed for ventilating a pie during the baking operation. The principal object of the invention is the provision of an article of this kind which is simple and inexpensive, and which entirely eliminates the possibilty of the juices of the pie rising to the top of the upper crust during the baking operation.

Another object of the invention is the provision of an article of this kind which is easily applied to a pie before baking and which may be supported on the lower crust of the pie during the baking operation and readily removed therefrom when the baking operation is complete.

To these and other ends, the invention consists in the construction and arrangement of parts that will appear from the following description when read in conjunction with the accompanying drawing, the novel features being pointed out in the claim at the end of the specification.

Figure 1:
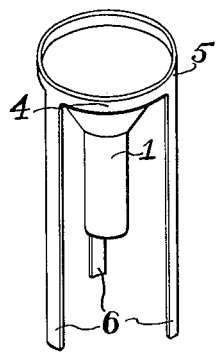
Fig. 1 is an isometric view of a pie ventilator constructed according to one embodiment of the invention.
Figure 2:
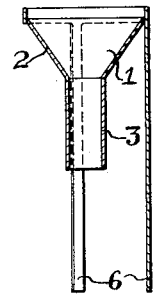
Fig. 2 is a transverse vertical section of the same.

Referring more particularly to the drawing, the improved ventilator comprises a funnel-shaped member 1 preferably constructed of sheet material and having a conical-shaped upper portion 2 having downwardly and inwardly directed walls leading to a vertical tubular portion 3 secured thereto or formed integral therewith.

Means in the form of a suitable stand is provided for supporting the funnel-shaped member on the bottom crust of a pie or other suitable support. Said supporting means in the present embodiment comprises a tripod member 4 having a ring 5 in which the upper end of the conical-shaped portion of the member 1 is secured by soldering, welding or other convenient means. Spaced equidistantly from each other and depending from this ring are a plurality of legs 6, three being shown in the present embodiment although a greater number may be employed without departing from the spirit of the invention. The legs 6 are secured to or formed integral with the ring 5 and extend downwardly in parallel relation with the axis of the tubular member 1. The legs 6 are of greater length than the tubular member 1 and may project downwardly therefrom to any desired or preferred extent, depending on the thickness or depth of the pie with which it is to be used.

Figure 3:
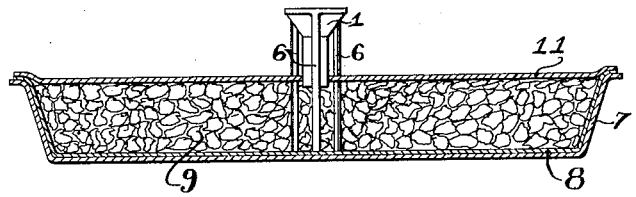
Fig. 3 is a transverse vertical section of a pie before baking showing the improved ventilator applied thereto.

In Fig. 3 is shown a pie before baking, arranged in a conventional pie tin 7 and showing one of the improved pie ventilators arranged in operative position. While only one ventilator is shown applied to the pie, it will be understood that a greater number may be employed if desired without departing from the spirit of the invention. Said pie comprises a lower crust 8 which serves as a lining for the tin and retaining means for the pie when removed therefrom after baking. A filler 9 of fruit or other preferred material is placed in the lower crust and on the filler is placed an upper crust 11 which is pliable before baking and rests on the filler with its outer periphery resting on and in contact with the upper outwardly turned edge of the lower crust. Before baking, the crusts are relatively soft and pliable, and the legs of the ventilator may be pressed against the upper crust which they pierce by reason of its softness and they may be pushed through the filler until they rest upon the upper surface of the lower crust and the tubular part 3 has penetrated the upper crust and projects into the upper portion of the filler. If desired, the upper crust may be provided with an opening for the tubular member 3 before applying it to the pie or it may be permitted to cut its own opening in the soft crust.

While the pie is being baked, a certain amount of juice or liquid is formed from the filler and is retained in the lower crust. As the temperature rises, this juice boils and generates vapor or steam which creates internal pressure in the pie which has a tendency to bulge or lift the soft upper crust from the filler, which position it assumes permanently as the crust hardens by baking, resulting in a pie having a deformed appearance. If a vent opening is simply made in the upper crust, this vapor escaping rapidly under pressure has a tendency to carry the juices to the top of the upper crust and discolor it, which is also undesirable. By the use of one or more of the improved ventilators, ample outlet for the vapor collected under the upper crust may be provided. If, however, an excess is formed in the filler, it rises in the member 1 and flows back into the pie from the tubular part 3 when the pressure is relieved as a result of boiling away on contracting when allowed to cool, and does not flow over the top of the upper crust. When the baking is complete, the ventilator may be removed from the upper crust without leaving any undesirable traces thereon.

Although only one embodiment of the invention is shown and described herein, it will be understood that this application is intended to cover such changes or modifications as come within the spirit of the invention or scope of the following claim.

I claim:

A pie ventilator comprising a cylindrical vent tube of relatively small diameter adapted to penetrate the upper crust of a pie, the lower end of the vent tube when in operative position being located but slightly under said upper crust, the upper end of the vent tube being connected to the lower end of a funnel-shaped portion located above the upper crust, and supporting means comprising a plurality of legs depending from the upper edge of said funnel-shaped portion and adapted to penetrate the upper crust and rest on the lower crust, said legs being spaced laterally from the cylindrical vent tube and the space therebetween being free in the plane of the upper crust.

ALICE M. VRAGEL.